US011120407B2

(12) United States Patent
Engrav et al.

(10) Patent No.: US 11,120,407 B2
(45) Date of Patent: Sep. 14, 2021

(54) REAL TIME COLLABORATION IN CALENDAR

(71) Applicant: Microsoft Technology Licensing, LLC, Redmond, WA (US)

(72) Inventors: Peter L. Engrav, Seattle, WA (US); Aaron E. Erlandson, Kirkland, WA (US); Trevor J. Harris, Seattle, WA (US); Malia M. Douglas, Seattle, WA (US); Rachel Sirkin, Seattle, WA (US); Caitlin E. Ashley-Rollman, Seattle, WA (US); Steven E. Lucco, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 16/414,367

(22) Filed: May 16, 2019

(65) Prior Publication Data

US 2020/0364673 A1 Nov. 19, 2020

(51) Int. Cl.
*H04L 29/06* (2006.01)
*H04L 12/58* (2006.01)
*G06Q 10/10* (2012.01)

(52) U.S. Cl.
CPC ....... *G06Q 10/1093* (2013.01); *H04L 51/046* (2013.01); *H04L 65/403* (2013.01)

(58) Field of Classification Search
CPC ............ G06Q 10/109; G06Q 10/1093; G06Q 10/1095; H04L 51/04; H04L 51/046; H04L 65/403
USPC ........................................................ 709/204
See application file for complete search history.

(56) References Cited

U.S. PATENT DOCUMENTS

| 5,845,257 | A  | 12/1998 | Fu et al. |
| 5,970,466 | A  | 10/1999 | Detjen et al. |
| 6,978,271 | B1 | 12/2005 | Hoffman et al. |
| 7,305,491 | B2 | 12/2007 | Miller et al. |
| 7,318,040 | B2 | 1/2008  | Doss et al. |
| 7,325,198 | B2 | 1/2008  | Adcock et al. |
| 7,689,448 | B2 | 3/2010  | Fu et al. |

(Continued)

FOREIGN PATENT DOCUMENTS

| CN | 101145223 A | 3/2008 |
| CN | 101520862 A | 9/2009 |
| CN | 105279637 A | 1/2016 |

OTHER PUBLICATIONS

"Non Final Office Action Issued in U.S. Appl. No. 16/414,317", dated Oct. 27, 2020, 16 Pages.

(Continued)

*Primary Examiner* — Ruolei Zong
(74) *Attorney, Agent, or Firm* — International IP Law Group, PLLC

(57) ABSTRACT

An apparatus for a real-time collaboration in calendar is described herein. The apparatus includes a state change module to receive a change notification at a second calendar client rendering a shared calendar. The apparatus also includes an identification module to retrieve an identification (ID) of calendar content, a change in a user interface state, and an extent of a calendar view from a first data structure. Finally, the apparatus includes a replica module of the second client to retrieve calendar content from a second data structure using the ID as an index value.

17 Claims, 7 Drawing Sheets

(56) References Cited

U.S. PATENT DOCUMENTS

| | | | |
|---|---|---|---|
| 7,830,751 | B2 | 11/2010 | Parees et al. |
| 8,295,126 | B2 | 10/2012 | Wood et al. |
| 8,375,292 | B2 | 2/2013 | Coffman et al. |
| 8,434,026 | B2 | 4/2013 | Stewart et al. |
| 8,538,992 | B1 | 9/2013 | Lawyer et al. |
| 8,607,250 | B2 | 12/2013 | Oral et al. |
| 8,713,435 | B2 | 4/2014 | Guan et al. |
| 9,195,972 | B2 | 11/2015 | Gopinath et al. |
| 9,438,649 | B2 | 9/2016 | Tallett |
| 9,843,895 | B2 | 12/2017 | Huang et al. |
| 10,032,135 | B2 | 7/2018 | Siu et al. |
| 10,140,324 | B2 | 11/2018 | Massarella et al. |
| 10,521,084 | B2 | 12/2019 | Anzures et al. |
| 10,586,216 | B2 | 3/2020 | Miller et al. |
| 10,769,132 | B1 | 9/2020 | Sharif et al. |
| 2003/0088427 | A1 | 5/2003 | Elsey et al. |
| 2004/0104937 | A1 | 6/2004 | An |
| 2006/0136121 | A1 | 6/2006 | Eisen |
| 2007/0005409 | A1 | 1/2007 | Boss et al. |
| 2007/0150502 | A1 | 6/2007 | Bloebaum et al. |
| 2007/0180375 | A1 | 8/2007 | Gittelman et al. |
| 2007/0180377 | A1 | 8/2007 | Gittelman et al. |
| 2007/0186193 | A1 | 8/2007 | Curran |
| 2008/0022201 | A1 | 1/2008 | Chen et al. |
| 2008/0059618 | A1 | 3/2008 | May et al. |
| 2008/0162234 | A1 | 7/2008 | Lu et al. |
| 2009/0040875 | A1 | 2/2009 | Buzescu et al. |
| 2009/0112986 | A1* | 4/2009 | Caceres ............... G06Q 10/109 709/204 |
| 2009/0168609 | A1 | 7/2009 | Weir et al. |
| 2010/0075648 | A1 | 3/2010 | Matsuoka et al. |
| 2010/0162105 | A1 | 6/2010 | Beebe et al. |
| 2010/0175001 | A1 | 7/2010 | Lazarus et al. |
| 2010/0330974 | A1* | 12/2010 | Balannik ............... G06Q 10/109 455/418 |
| 2011/0216628 | A1 | 9/2011 | Nalla et al. |
| 2011/0252351 | A1 | 10/2011 | Sikora et al. |
| 2011/0305437 | A1 | 12/2011 | Sakaguchi et al. |
| 2012/0084286 | A1 | 4/2012 | Hubner et al. |
| 2012/0197900 | A1 | 8/2012 | Mandre |
| 2012/0233563 | A1 | 9/2012 | Chakra et al. |
| 2014/0047312 | A1 | 2/2014 | Ruble et al. |
| 2014/0074536 | A1* | 3/2014 | Meushar ............ G06Q 10/1095 705/7.19 |
| 2014/0136263 | A1* | 5/2014 | Lee .................... G06Q 10/1095 705/7.19 |
| 2014/0156597 | A1 | 6/2014 | Hakami et al. |
| 2014/0365951 | A1 | 12/2014 | Fernandes et al. |
| 2015/0156026 | A1 | 6/2015 | Gault et al. |
| 2015/0178690 | A1 | 6/2015 | May et al. |
| 2015/0199077 | A1 | 7/2015 | Zuger et al. |
| 2015/0268839 | A1 | 9/2015 | Tallett |
| 2015/0294273 | A1 | 10/2015 | Barraci et al. |
| 2015/0347982 | A1* | 12/2015 | Jon ................... G06Q 10/1095 705/7.19 |
| 2015/0378619 | A1* | 12/2015 | Maeda ................ G06F 16/447 707/725 |
| 2015/0379476 | A1* | 12/2015 | Chaudhri ................ G06F 1/163 705/7.18 |
| 2016/0104119 | A1 | 4/2016 | Von hessberg et al. |
| 2016/0189111 | A1* | 6/2016 | Bookallil ............. G06Q 10/109 705/7.19 |
| 2016/0203444 | A1 | 7/2016 | Frank et al. |
| 2016/0259761 | A1 | 9/2016 | Laborczfalvi |
| 2016/0275458 | A1* | 9/2016 | Meushar ............ G06Q 10/1095 |
| 2016/0350721 | A1 | 12/2016 | Comerford et al. |
| 2016/0364698 | A1 | 12/2016 | Bouz et al. |
| 2016/0370985 | A1 | 12/2016 | Tallett |
| 2017/0024705 | A1 | 1/2017 | Richardson et al. |
| 2018/0077542 | A1* | 3/2018 | Xie ........................ H04W 4/12 |
| 2018/0089632 | A1* | 3/2018 | Singh ..................... G06F 16/27 |
| 2018/0095938 | A1 | 4/2018 | Monte |
| 2018/0114198 | A1* | 4/2018 | Ghotbi .............. G06Q 10/1097 |
| 2018/0189744 | A1* | 7/2018 | Frank ................. G06Q 10/1095 |
| 2018/0336532 | A1 | 11/2018 | Hillery |
| 2019/0121994 | A1 | 4/2019 | Embiricos et al. |
| 2020/0363910 | A1 | 11/2020 | Engrav et al. |
| 2020/0364199 | A1 | 11/2020 | Engrav et al. |

OTHER PUBLICATIONS

"Final Office Action Issued in U.S. Appl. No. 16/414,317", dated Jul. 1, 2020, 15 Pages.

"Notice of Allowance Issued in U.S. Appl. No. 14/220,386", dated May 6, 2016, 18 Pages.

"Final Office Action Issued in U.S. Appl. No. 15/256,666", dated Apr. 23, 2019, 14 Pages.

"Non Final Office Action Issued in U.S. Appl. No. 15/256,666", dated Nov. 16, 2018, 11 Pages.

Hinnant, Howard, "Chrono-Compatible Low-Level Date Algorithms", Retrieved From: https://howardhinnant.github.io/date_algorithms.html, Sep. 7, 2013, 24 Pages.

Masoodian, et al., "A Comparison of Linear and Calendar Travel Itinerary Visualizations for Personal Digital Assistants", In Proceedings of the OZCHI, the CHISIG Annual Conference on Human-Computer Interaction, Nov. 20, 2004, 10 Pages.

"International Search Report and Written Opinion Issued in PCT Application No. PCT/US2020/028027", dated Jul. 20, 2020, 11 Pages.

"International Search Report and Written Opinion Issued in PCT Application No. PCT/US2020/028029", dated Jul. 23, 2020, 11 Pages.

"International Search Report and Written Opinion Issued in PCT Application No. PCT/US20/028030", dated Jun. 2, 2020, 11 Pages.

"Non Final Office Action Issued in U.S. Appl. No. 16/414,374", dated Sep. 8, 2020, 12 Pages.

"Non Final Office Action Issued in U.S. Appl. No. 16/414,317", dated Jan. 7, 2020, 15 Pages.

"Notice of Allowance Issued in U.S. Appl. No. 16/414,317", dated Mar. 16, 2021, 9 Pages.

"Behavior and Format of the Date and Time Field", Retrieved From: https://docs.microsoft.com/en-US/previous-Versions/dynamicscrm-2016/administering-dynamics-365/dn946904(v-crm.8)?redirectedriom-MSDN, Nov. 28, 2016, 10 Pages.

"Google Calendar", Retrieved from: https://www.google.com/calendar/about/, Retrieved Date: Feb. 11, 2021, 2 Pages.

"Using Date, Date/Time, and Time Values in Formulas", Retrieved from: https://help.salesforce.com/articleView?id=sf.formula_using_date_datetime.htm&type=5, Retrieved Date: Feb. 11, 2021, 4 Pages.

Agnantis, et al., "Intelligent Calendar Applications: A Holistic Framework based on Ontologies", In International Journal of Artificial Intelligence, vol. 14, Issue 2, Oct. 2016, 21 Pages.

Cranshaw, et al., "Calendar.help: Designing a Workflow-Based Scheduling Agent with Humans in the Loop", In Repository of arXiv: 1703.08428v1, Mar. 24, 2017, 12 pages.

Krzywicki, et al., "Closed Pattern Mining for the Discovery of User Preferences in a Calendar Assistant", In Book of New Challenges in Applied Intelligence Technologies, Jan. 2008, 11 Pages.

"Notice of Allowance Issued in U.S. Appl. No. 16/414,374", dated Jun. 23, 2021, 9 Pages.

\* cited by examiner

REAL TIME COLLABORATION IN CALENDAR

BACKGROUND

The present disclosure generally relates to calendar systems. In particular, the present disclosure relates to real-time collaboration in calendar.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, an apparatus for a real-time collaboration in calendar is described. The apparatus includes a state change module to receive a change notification at a second calendar client rendering a shared calendar. The apparatus also includes an identification module to retrieve an identification (ID) of calendar content, a change in a user interface state, and an extent of a calendar view from a first data structure. Finally, the apparatus includes a replica module of the second client to retrieve calendar content from a second data structure using the ID as an index value.

In another embodiment described herein, a method is described. The method includes receiving a change notification and retrieving an identification (ID) of calendar content, a change in a user interface state, and an extent of a calendar view from a first data structure. The method also includes retrieving the calendar content from a second data structure using the ID as an index value.

Additionally, in an embodiment described herein, a system is described. The system includes a first calendar client rendering a shared calendar, wherein the first calendar client issues a change to a user interface state of the shared calendar, an extent of a calendar view, or calendar content, and updates a first data structure in response to the change in the user interface state or the extent of the calendar view, and updates a second data structure in response to the change in the calendar content. The system also includes a state change module to receive a change notification at a second calendar client rendering the shared calendar, and an identification module to retrieve an identification (ID) of calendar content, the change in the user interface state, and the extent of the calendar view from the first data structure. Finally, the system includes a replica module of the second client to retrieve calendar content from the second data structure using the ID as an index value.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1A:
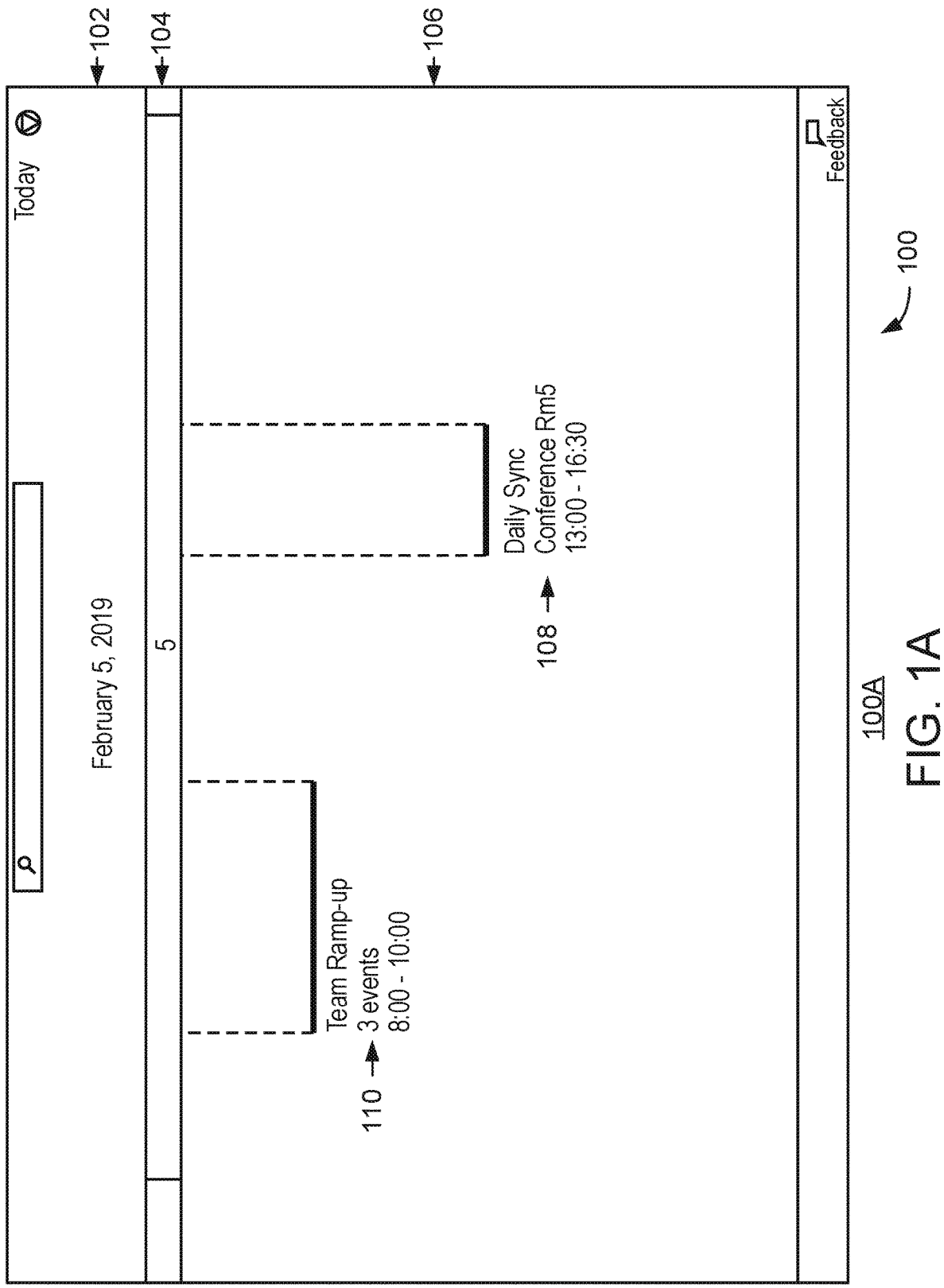
FIG. 1A is a block diagram of a map calendar with a day-based time organization.

A digital calendar is an electronic system used to organize time. The digital calendar may be implemented as an application (app) on a user device. In examples, the digital calendar may include, but is not limited to, interfaces, routines, data structures, data storage, or any combination thereof. Portions of the calendar system are stored locally on a computing device, such as a state of the user interface. Other portions of the calendar system may be stored locally on the computing device or remotely across a networked connection. Remote storage locations include, but are not limited to, a cloud computing device or a remote network server. Calendar applications often enable synchronization of calendar content between users via networking protocols that define services and protocols for communication between devices on a network. In some cases, access to the calendar content associated with a particular calendar may be shared across a plurality of users.

In a shared calendar, calendar content may be transmitted to a remote server for storage. Devices with permission to access the calendar content of the shared calendar may access the remote server to retrieve and render the shared calendar content. Some devices may have permission to make changes to the content, including but not limited to the ability to modify, share, add, or delete calendar content. These changes to the calendar content may be available for rendering on other devices with access to the calendar content for rendering. However, in traditional electronic calendar systems, changes to the calendar content of a shared calendar are not immediately rendered on network devices. Moreover, the user interface and an associated user interface state of a first calendar client are not shared in a traditional electronic calendar system. Rather, the user interface and the user interface state are stored locally.

Further, the user interface of traditional electronic calendars mimics the same cyclic patterns established by paper calendars. In particular, traditional electronic calendar systems also include groupings of days, weeks, and years. The traditional electronic calendar systems can enable views of time according to each unit of time. For example, with a traditional electronic calendar system a user can view a particular day and the events scheduled for that day. Traditionally, a user may also view a month. The conventional month view typically renders the days of the month in a two-dimensional format. Finally, years are viewable in a traditional electronic calendar system as a grouping of several months. In some cases, each year is a plurality of months rendered in a sequential fashion. Thus, in a traditional electronic calendar system, measures of time are illustrated as a two-dimensional block diagram time.

The present techniques enable real-time collaboration in calendar. In particular, the present techniques enable the real-time sharing of content and a user interface state of an electronic calendar system. Collaboration across multiple calendar clients is enabled via a manipulation of the user interface, changes to the calendar content, and the subsequent retrieval of the changes to the user interface and calendar content. In an electronic calendar system, manipulation of a shared calendar rendered at a first calendar client of a first device causes the same manipulation to be rendered on all devices executing a local calendar client with the shared calendar visible. In this manner, changes made to a shared calendar at a first user interface are immediately reflected by all other calendar clients where the shared calendar is open and presently rendered on a display.

In embodiments, the user interface of the calendar described herein is a digital map calendar user interface. The digital map calendar is a map-based system for organizing time, where the calendar content is rendered using a coordinate plane. In examples, the digital map calendar user interface is an extension of widely accepted calendar systems as described below. As described herein, the present techniques organize time into a continuous, manipulatable sequence of data. In particular, the manipulation of the map calendar enables real-time shifting or conversion of the units of time used to render calendar content. The calendar system according to the present techniques is able to be panned as though moving across a panorama. Furthermore, the calendar system according to the present techniques is zoomable, where a user can zoom-in or out to view time organized in different units. Moreover, the present techniques enable relationships between calendar content rendered by the map calendar system, including events.

Figure 5:
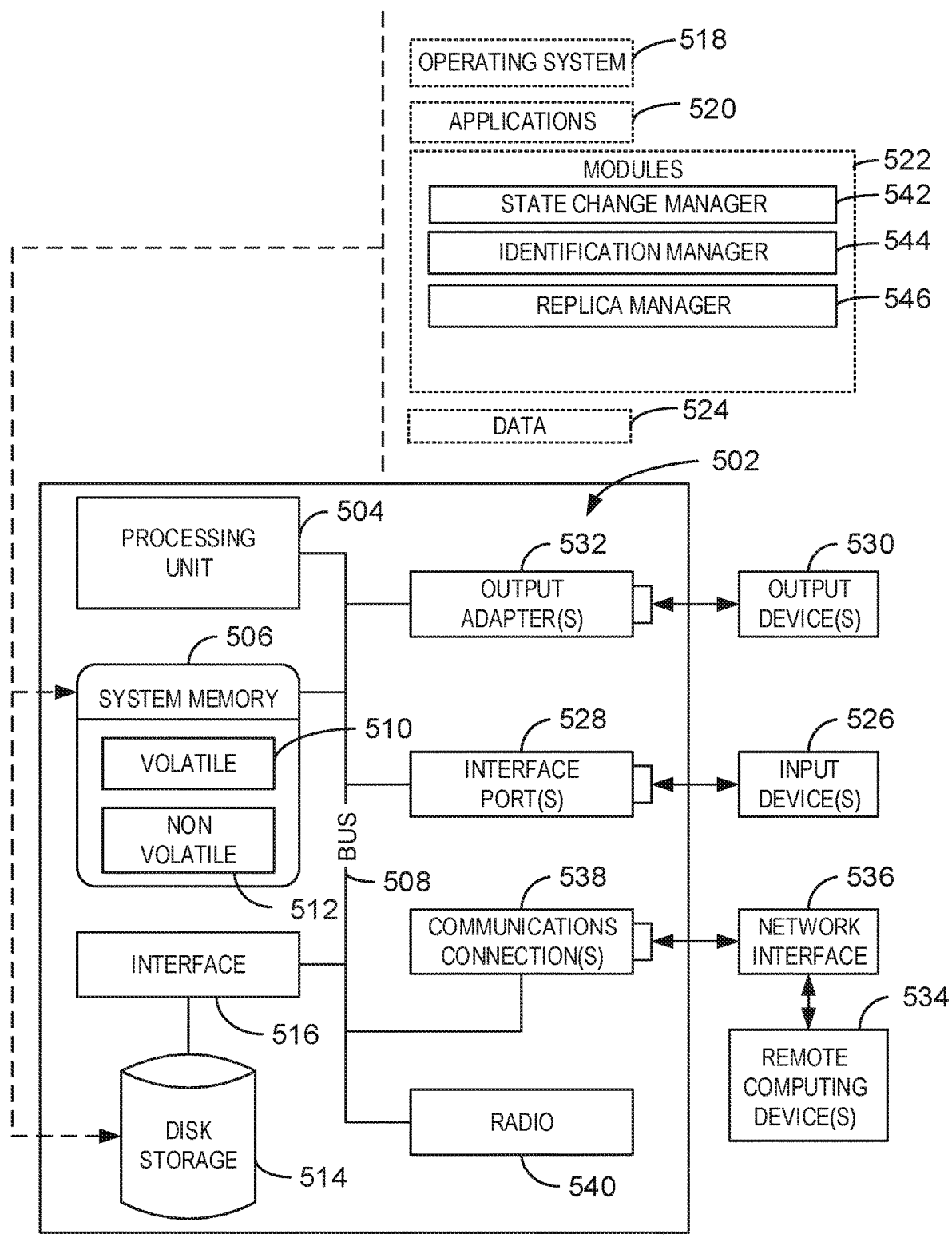
FIG. 5 is a block diagram of an example of a computing system that can enables real-time collaboration in calendar.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 5, as discussed below, provides details regarding different systems that may be used to implement the functions shown in the figures.

Other figures may describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, medium, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device. While computer-readable media may reproduce and/or cause to deliver the computer-executable instructions and data to a computing device for execution by one or more processor via various transmission means and mediums including carrier waves and/or propagated signals, for purposes of this disclosure computer readable media or a computer readable medium expressly excludes carrier waves and/or propagated signals.

FIG. 1A is a block diagram of a map calendar 100 with a day-based time organization. The map calendar 100 may be generated by a calendar client and rendered on a view 100A of a display of an electronic device, such as the computing device 502 of FIG. 5. The view 100A rendered at the display may be manipulated via input from a user. Manipulation of the map calendar may be defined as a continuous movement of a calendar view. The manipulation can result in the addition of calendar content to the calendar view, or the manipulation can result in the subtraction of calendar content from the calendar view. Moreover, the manipulation of the calendar content may result in any combination of addition or subtraction of the calendar content to a calendar view. As used herein, continuous refers to a smooth, unbroken transition from a first calendar view to a second calendar view. Rendered calendar content is updated in response to a manipulation in a seamless, visually unbroken manner. Additionally, as used herein a user interface may be generally defined as elements that enable interaction between a user and an electronic device. The user interface may include elements such as images, text, links, buttons, scroll bars, and the like. Moreover, the user interface can include gestures as captured by a touchscreen of an electronic device.

When manipulating the user interface, a user may pan or scroll along an axis of time presented by the map calendar. In this manipulation, content is added and subtracted to the calendar view as the view changes to render future or past calendar content at differing times, according to the same time unit. A user may also zoom-in or zoom-out of a time representation presented by the map calendar. In embodiments, a zoom-in function results in increasingly smaller units of time rendered by the map calendar. Conversely, a zoom-out function results in increasingly larger units of time rendered by the map calendar. In a zoom type manipulation, content is added and subtracted to the calendar view as the view changes to render future or past calendar content at substantially the same times using varying time unit granularities. In this manner, the map calendar is a dynamic organization of time that can be manipulated by a user. The organization of time enabled by the map calendar is not limited by the particular format of calendar system. In particular, the time units may be according to any calendar system. The present techniques also enable a toggle between different calendar systems. For example, a calendar view may be rendered according to a Gregorian calendar system and the toggled to render the same calendar view according to a Japanese calendar system, where the Japanese calendar system includes representing time based on the reign of the current Emperor.

Figure 1B:
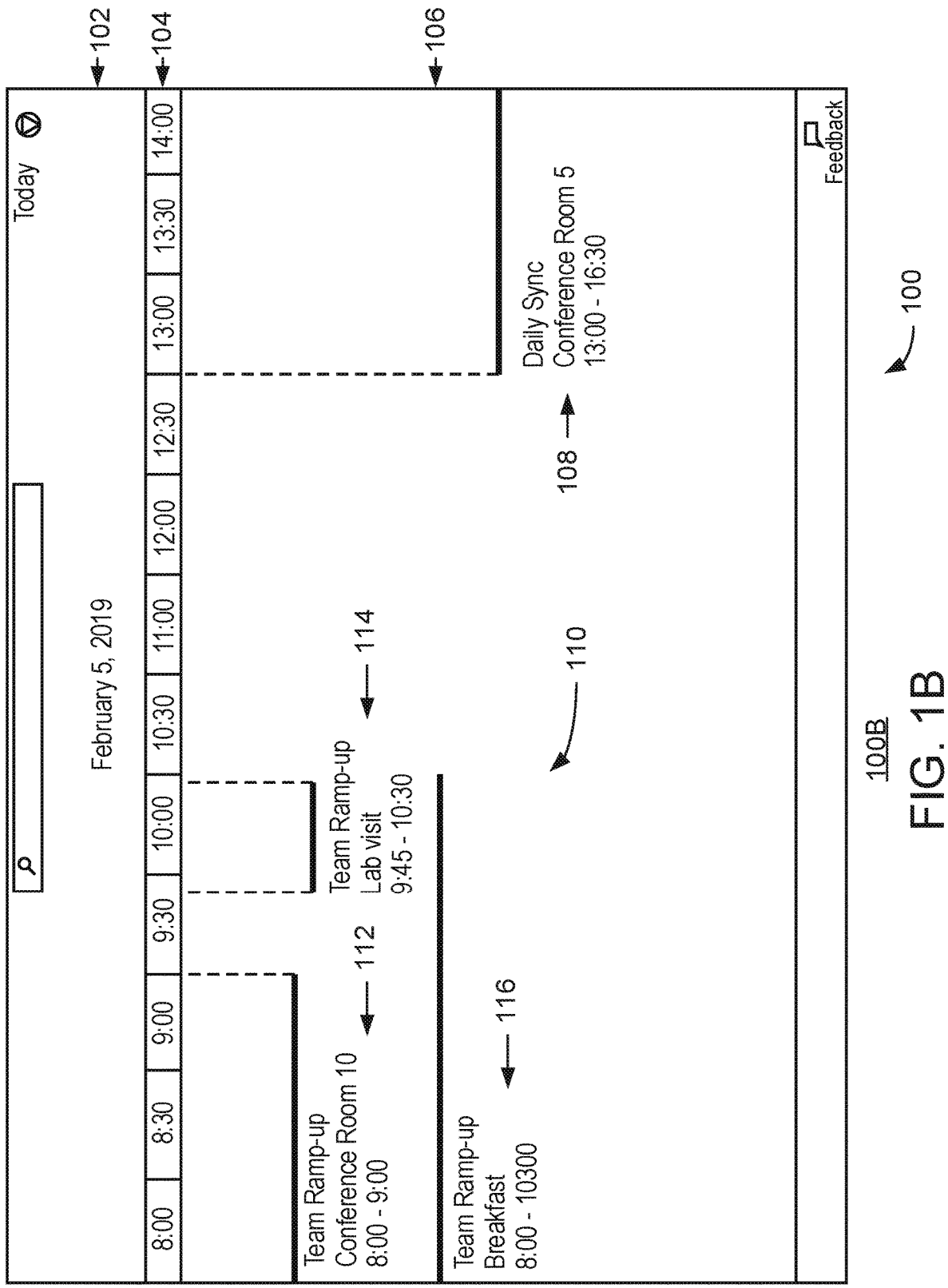
FIG. 1B is a block diagram of the map calendar with a thirty minute-based time organization.

Generally, the map calendar according to the present techniques organizes calendar content using a coordinate plane. The coordinate plane may be considered a grid that is used to convey time information associated with content to be rendered by the map calendar. Thus, the map calendar can include a horizontal axis and a vertical axis. The horizontal axis and the vertical axis are perpendicular to each other. The horizontal axis may be generally referred to as the X-axis, and the vertical axis may be generally referred to as the Y-axis. According to the present techniques, the X-axis of the map calendar represents time. In the example of FIGS. 1A-1B, a time value may increase when moving from left to right along the x-axis of the map calendar 100. For ease of description, the present techniques describe time as being a unit of measure along the X-axis. However, time can be organized along either the X-axis or the Y-axis, and the map calendar according to the present techniques should not be viewed as limited by a particular axis of the coordinate plane. Moreover, the remaining axis (the axis other than the axis used to represent time) is not limited to the representation of a particular value. The remaining axis can be modified according to rules and user preferences as described herein. In embodiments, the remaining axis (the Y-axis in the example of FIGS. 1A, 1B, 2A, and 2B) is used to partition the calendar content according to a calendar content type. For example, content items from a work calendar may be referred to as work-type content items, while content items from a school calendar may be referred to as school-type content items. The differing content item types may be rendered at different positions along Y-axis according to type. As used herein, a content item type refers to a category associated with the content item. The content item type includes, but is not limited to, locations, people, sources, and levels of time.

The map calendar 100 includes a label section 102, a header section 104, and an event section 106. For ease of description, the label section 102, the header section 104, and the event section 106 are positioned in certain layout. In particular, the label section is illustrated at the top of the rendered map calendar 100, with the header section 104 immediately below the label section 102. Further, section 106 is illustrated as immediately below the header section 104. However, the present techniques are not limited to the particular layout illustrated in the Figures. Rather, the label section 102, the header section 104, and the event section 106 can be positioned at any location in the rendered map calendar 100. Moreover, some sections may be hidden or otherwise removed from the map calendar.

In the illustration of FIG. 1A, the label section 102 provides labels or names associated with the particular unit of time presently rendered by the map calendar 100. For example, the label section 102 of FIG. 1A is illustrated as rendering Feb. 5, 2019. Accordingly, the map calendar 100 includes events that occur on Feb. 5, 2019. The label section 102 will update in response to a user manipulating the calendar view within the event section 106. For example, if content for a single year is rendered, the label section 102 will update to reflect the particular year being rendered. Accordingly, the label section 102 enables a dynamic labeling function that corresponds to the unit of time rendered in the calendar view. In embodiments, the label rendered by the label section 102 may be approximate, where the label to be rendered is selected based on a closest or nearest unit of time rendered in the calendar view.

The header section 104 renders the particular units of time along the X-axis. In particular, the header section 104 is illustrated as including header blocks with units of time designated in the header. In the example of FIG. 1A, "Feb. 5, 2019" is rendered in the label section 102. The header section 104 includes the number five to indicate the calendar content rendered is from the fifth day of February. The events section 106 includes calendar content, such as events associated with particular times on Feb. 5, 2019. As used herein, an event is a circumstance associated with a general time frame. An event is calendar content, where other examples of calendar content include but are not limited to, media content such as photographs, audio, video, social networking blurbs, links such as links to other applications, and the like. Calendar content may also include applications.

For example, a drawing application may be considered calendar content. The drawing application enables a user to share drawings with other users of the same calendar. Further, calendar content can also include "To-Do" item or a "Task" item. A To-Do or Task item is generally calendar content that indicates to a user a specific action that should be taken by the user prior to a specific deadline. By contrast, an event is a circumstance which may or may not include a specific action associated with a general time frame. The To-Do and Task items can be rendered in a list format, where a user can revise the To-Do and Task items to reflect progress made by the user on completing the items. Generally, some events may have well defined start and stop times, whereas other events are associated with a general time. In embodiments, calendar content can have relationships with other calendar content as discussed herein. The event relationships, the pan level and the zoom level are factors in how events are rendered in the events section 106.

As rendered in the view 100A, the map calendar 100 includes event 108 and event 110. Each of the events are illustrated along in the X-axis of the map calendar according to their scheduled occurrence in time. For example, the event 108 has a description block that provides additional details regarding the event. In particular, the event 108 has a title of "Daily Sync," a location portion of "Conference Rm 5," and a time from 130-200 hours. The event 110 has a title of "Team Ramp-Up," an enumeration portion that reads "3 events," and a time from 130-200 hours.

Because the event 110 is associated with at least one other event as indicated by the event enumeration portion of the description block, the event 110 may be considered a parent event. The additional events identified by the event enumeration portion of a parent event may be referred to as child events. In embodiments, a child event may also be a parent event. The time indication portion of the description block gives a specific time range associated with the event 110.

FIG. 1B is a block diagram of the map calendar 100 with a thirty minute-based time organization. The map calendar 100 in FIG. 1B may be rendered on a view 100B of an electronic device. The view rendered at the view 100B may be manipulated via input from a user. In examples, the map calendar 100 in FIG. 1B is a different view of the map calendar 100 as illustrated in FIG. 1A. However, in FIG. 1B a zoom-in function has changed the calendar view to a thirty minute-based organization system.

The label section 102 of FIG. 1B is illustrated as a particular day, Feb. 5, 2019. The header section 104 includes header blocks, where each header block corresponds to a period of thirty minutes. The events section 106 of FIG. 1B includes event 108, parent event 110, child 112, child event 114, and child event 116. Each of the event is associated with a description block as illustrated. For example, child event 112 is associated with a description block that includes a title "Team Ramp-Up," a location of "Conference Room 10," at a time from 800 hours to 900 hours. Similarly, child event 114 is associated with a description block that includes a title "Team Ramp-Up," a location of "Lab Visit," and a time period from 945 hours to 1030 hours. Finally, the child event 116 is associated with a description block that includes a title of "Team Ramp-Up," an action of "Breakfast," and a time period from 800 hours to 1030 hours.

Event 110 is a parent event. In particular, the event 110 has three child events as indicated by the description block. In embodiments, a parent event may be a semantic parent event. A semantic parent event may refer to the parent event in a parent-child relationship that is understood by humans. For example, consider a shared calendar with events centered around a "Team Ramp-up" meeting. The meeting will include (1) Breakfast, (2) Meeting in Conference Room 10, and (3) Visiting a lab. When the map calendar is displayed at a single day view, the parent event 110 is rendered in a general, less busy view. However, in a finer, zoomed-in hour-by-hour view, each child event is rendered, thereby enabling a more detailed view. The view 100A may be manipulated via input from a user at a user interface. For example, the user may pan across time or the user may zoom-in on a particular time instance. Consider the scenario where a user initially has a view 100A and would like to "zoom-in" on a period of time during the event 110. The resulting view is that of FIG. 100B, where the parent event is represented by three child events.

According to the present techniques, the manipulation of the user interface of a shared calendar at a first client device is reflected immediately at the user interfaces of other client devices viewing the same shared calendar. In some cases, the manipulation of the user interface at a first client device is also a manipulation of calendar content rendered at first client device. A state of the user interface or a user interface state may refer to, for example, a condition or position of the user interface at a specific time as rendered at a client device. A manipulation of the user interface may result in a change to the user interface state. For example, in FIGS. 1A and 1B, a zoom function is applied to the user interface. An initial user interface state in FIG. 1A may be at a first zoom level. Once the zoom function is applied to the user interface, the user interface state in FIG. 1B may be at a second zoom level.

Additionally, when a zoom function is applied to the user interface, the extent of the current view across time may change. The extents of a calendar view refer generally to the duration of time rendered by the calendar view. For example, in the calendar view 100 of FIG. 1A, the entire time period from 1300 hrs. to 1630 hrs. is visible. However, in the calendar view 100 of FIG. 1B, the full extent of event 108 is not visible. Put another way, a portion of time visible in FIG. 1A is not visible in FIG. 1B. To enable real-time collaboration across shared calendars, the user interface state, the extent of the calendar view, and calendar content are stored using a set of networking services and protocols that is able to replicate changes between multiple clients. Moreover, a set of distributed data structures may be used to store the user interface state, the extent of the calendar view, and calendar content associated with the calendar system. The distributed set of data structures may be integrated with the services and protocols used to replicate changes between multiple clients.

The core data structure used to support the networking services and protocols described herein may be referred to as a merge tree. The merge tree may be a data structure that enables indexing for a file that is subjected to a high rate of record inserts and deletes over a period of time. In embodiments, the merge tree may store data in a plurality of separate data structures, where each data structure is optimized for the particular storage medium used. The merge tree includes a number of levels, and each level stores an array of data. The data is indexed using a key to enable fast and reliable reads of data stored by the merge tree.

In addition to the abstraction enabled by indexing the merge tree, additional data structures can enable further levels of abstraction beyond the merge tree. In particular, data structures may be built on top of the merge tree that would more commonly be used by and familiar to an application. For example, an interval collection tree may store values used to render calendar content, such as unique identification (ID) values for each item of calendar content, changes in the user interface state, the extents of the calendar view, the zoom level, or any combination thereof. The extents of the calendar view may include an identification of the first and last time in the view. In embodiments, the interval collection tree is an implementation of a balanced tree, such as a red-black tree, where each node of the tree is an interval indicating the branch of the interval collection tree that stores values within the interval. Another data structure that enables an additional level of abstraction over the merge tree is a dictionary or map data structure. In embodiments, the map data structure maintains a set of key-value pairs. In embodiments, the map may be referred to as a key-value store.

A change in the user interface state creates data regarding the interface state that is typically stored locally on a client device. The data may fully specify the new extents and zoom-level of the current view, or the data may include the change in the extents and zoom-level from a first user interface state to a second user interface state. To replicate the changed user interface state across a plurality of client devices, each item in the calendar is assigned a unique identification (ID) by the client that creates the item of calendar content. The client that creates the calendar content then transmits the item for storage in the map data structure. In the map data structure, the unique ID may serve as the key. The value associated with the key in this map data structure is the calendar content. For example, the calendar content may include, but is not limited to, pictures, videos, animations, GIFs, events, titles, times, location, and the like. By storing the calendar data in the map, the calendar data appears instantly on other client devices executing the shared calendar as each client retrieves the stored calendar content in real-time.

In particular, a second client device executing the calendar application and currently rendering shared calendar receives a change notification issued in response to an updated map data structure. The change notification may be an alert that the user interface state, the extent of the calendar view, and calendar content rendered in a current calendar view at a first client device has changed. The change notification may also be an indication that new data is stored in the interval collection tree or the map data structure. The change notification may also include a pointer or other identification of the particular data structure has changed and an identification of a key into that data structure to indicate which fields are changing. For example, a change notification may include the following information: "Data at key 123 in map 456 is updated." A client that receives this change notification accesses the data structure, which is a map 456 in this example. The client then traverses the data structure via the key value, which is 123 in this example. In this manner, the second client is able to the updated data. That updated data might be, for instance, the new extents of the view on the screen.

In response to receiving the change notification, the calendar client stored on a remote, second client device may retrieve the updated user interface state, extent of the calendar view, calendar content, or any combination thereof. In examples, the interval collection tree may be used to retrieve an identification of the changed calendar content within a particular interval. The map is used to retrieve calendar content associated with unique ID. The second calendar client may then use the new data retrieved from the interval collection tree and the map to instantly and incrementally update the rendered calendar user interface at the second client device to reveal the new user interface state. By incrementally updating the calendar user interface to render the new user interface state at the second client device, the changes to the user interface are rendered in a smooth, continuous motion. This smooth, continuous motion is a repeat of the motion that occurred at the first client device, in real-time. In embodiments, rendering the new user interface state results in an addition of calendar content, a new position of the calendar view, or a change to the extent of time rendered in the calendar view. Rendering the new user state may also be an update to an existing item.

Note that for ease of description, the present techniques are presently described as manipulating a calendar view using a zoom—in function. However, the present techniques are not limited to the particular manipulations described herein. Accordingly, in embodiments the manipulation applied to the calendar view may include a zoom function, panning, rotating, and the like.

Figure 2A:
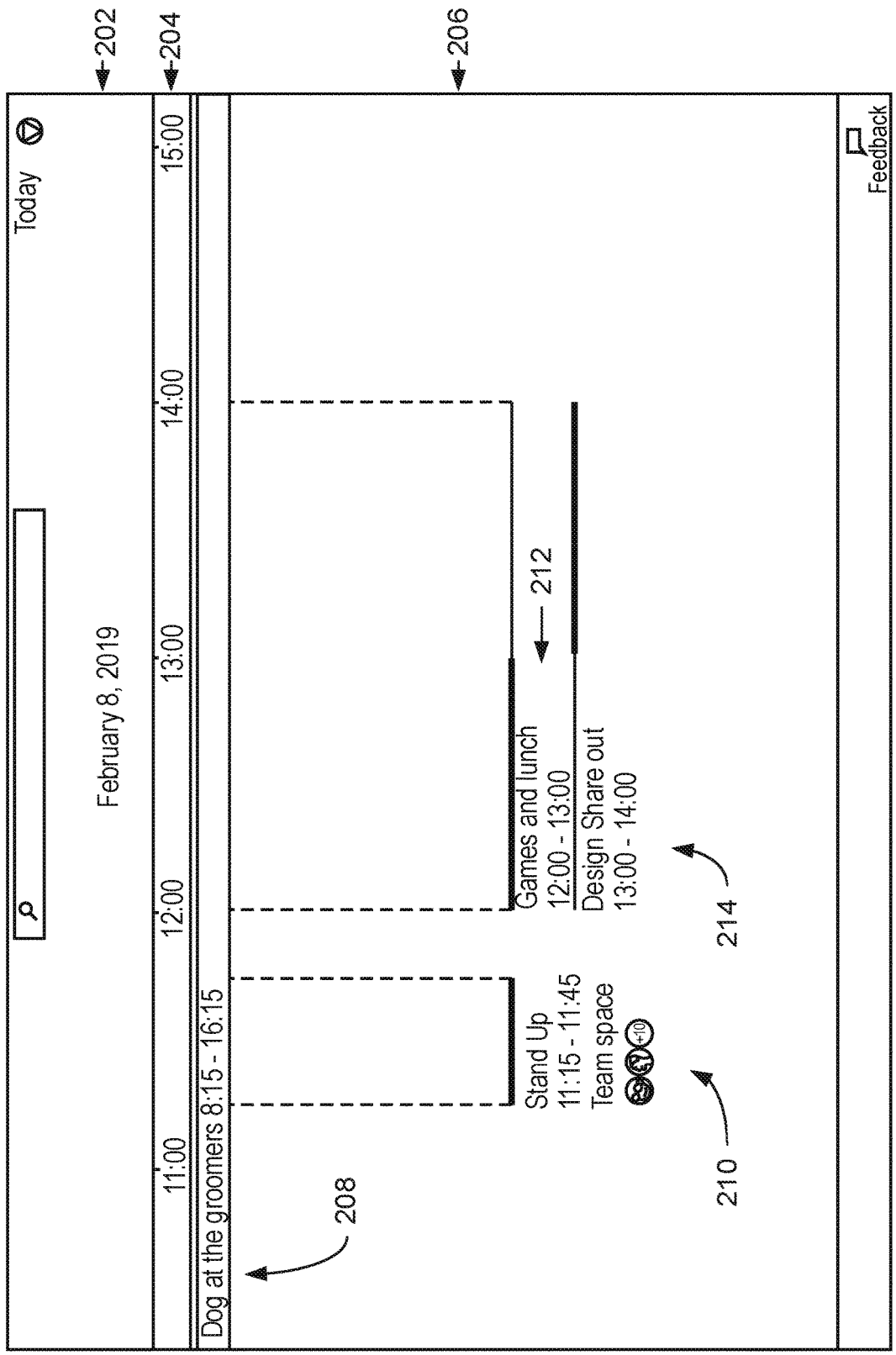
FIG. 2A is a block diagram of a map calendar with a multiple hour-based time organization.

FIG. 2A is a block diagram of a map calendar 200 with a multiple hour-based time organization. As illustrated, FIG. 2A includes a label section 202, a header section 204, and an events section 206. The header section 202 includes the label "Feb. 8, 2019." The header section 204 illustrates multiple hours of Feb. 8, 2019, from 1100 hours through 1500 hours. The event section 206 includes an event 208, event 210, and event 212. The event 208 includes a description line with the title "Dog at the Groomers," and a time frame from 815-1615 hours. The event 210 includes a description block with the title "Stand Up," a location of "Team Space," and a timeframe from 1115-1145 hours. Additionally, description box of event 210 includes representations of people associated with event 210. Event 212 includes a description box with a title "Games and Lunch," and a timeframe from 1200 to 1300 hrs.

Figure 2B:
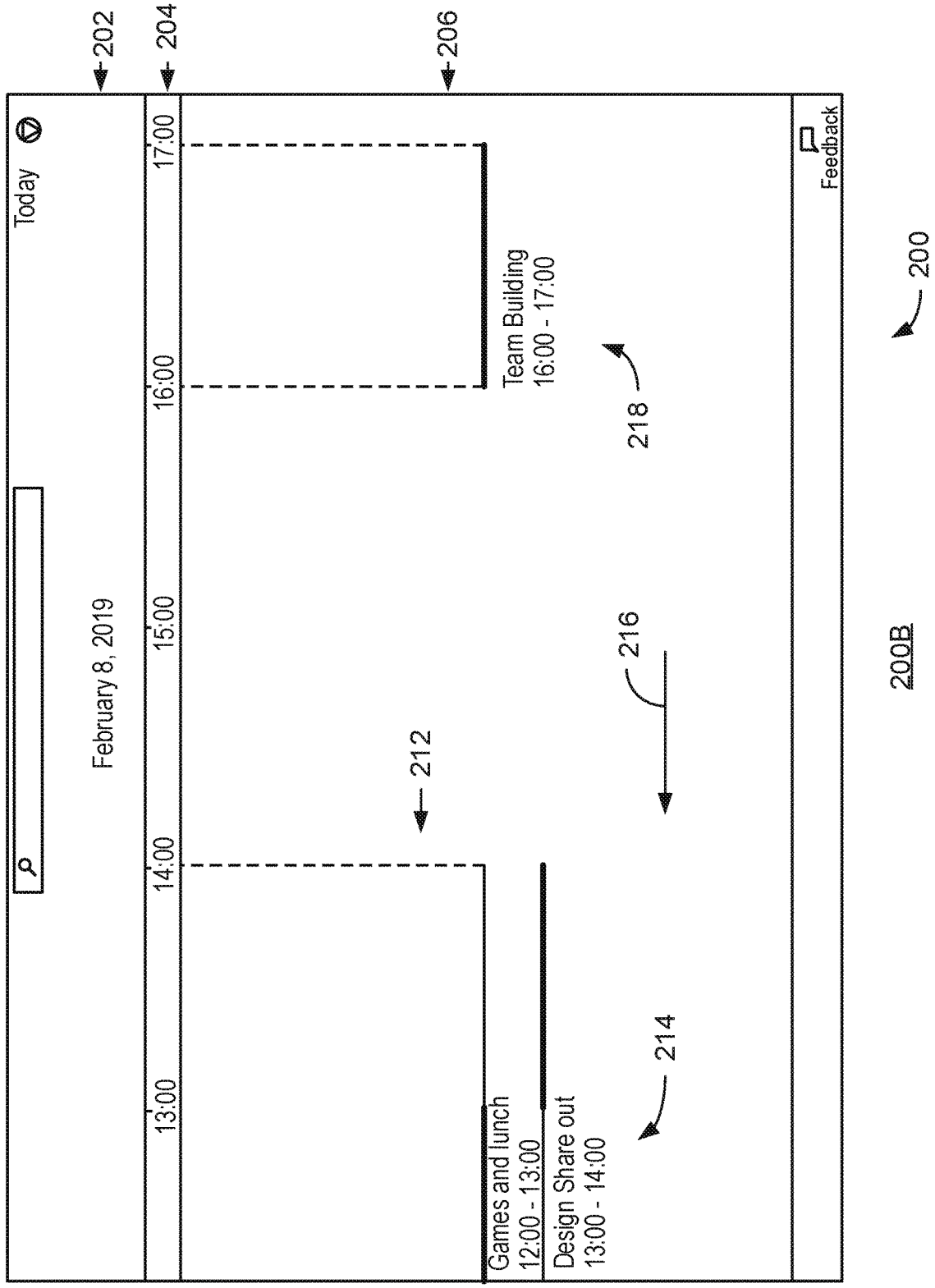
FIG. 2B is a block diagram of a map calendar with a multiple hour-based time organization.

As illustrated, the event 212 and the event 214 are rafted. The present techniques may "raft" events together when they no longer have enough space to be rendered in a side-by-side format without overlapping or otherwise obscuring text in the description block of the event. In embodiments, events are rafted together that are intended to be revealed at a given zoom level, do not have a semantic parent, and also do not have enough horizontal space at the zoom level to render details in the description box without overlapping. In the example of FIG. 2B, the event 210 has enough space to be displayed as a single item. However, the event 212 and the event 214 were deemed to be too close together, so they have formed a "raft."

FIG. 2B is a block diagram of a map calendar 200 with a multiple hour-based time organization. Similar to FIG. 2A, FIG. 2B also includes the label section 202, header section 204, and events section 206. FIG. 2B also includes event 208, event 210, event 212, and event 214. Since the time scale illustrated has shifted, FIG. 2B also includes an event 218, outside of the time range visible in FIG. 2A. Thus, the event 218 is not visible in FIG. 2A. Event 218 is associated with a description block that includes a title of "Team Building," and a time range from 1600 hrs. to 1700 hrs.

In examples, the view 200B as illustrated in FIG. 2B is shifted to the left when compared to the view 200A illustrated in FIG. 2A. The shift of the view 200A to the view 200B is illustrated in FIG. 2B by arrow 216. The arrow 216 may represent a manipulation of the user interface of a shared calendar in a first client device from the right to the left. This manipulation may be referred to as panning across the map calendar. Panning the user interface at the first client device results in a change to the user interface state. For example, in FIGS. 2A and 2B a panning function is applied to the user interface. An initial user interface state in FIG. 2A may be at a first panning position. Once the panning function is applied to the user interface in FIG. 2A, the user interface state in FIG. 2B may be at a second panning position. Changes in a panning position results in a change to the extents of the calendar view.

Similar to the example of FIGS. 1A and 1B above, each calendar item may be stored in the map data structure. Each event, such as event 208, event 210, event 212, event 214, and event 218, may be stored in the map where each event is associated with a unique ID. The value corresponding to each unique ID are the actual contents of the calendar content. For example, the actual contents may include the title, times, location, and other content associated with the calendar content. Similar to the example of FIGS. 1A and 1B, the modification or change applied to the calendar content at a first client device may be transmitted from the first client to a map data structure. Once changed calendar content is stored in the map data structure, a change notification may be transmitted to other client devices currently rendering the shared calendar. In response to the change notification, the other client devices may retrieve the new calendar and render the new data in real-time based on the retrieved user interface state and extents of the calendar view.

In some instances, the manipulation of a calendar view causes a new item of calendar content to appear in a calendar view. All items of calendar content in a shared calendar are indexed in an interval collection tree based on the time at which the item occurs. For example, a calendar item with an associated time range from 1 PM to 2 PM on Sunday, February 8 may use this associated time as an index in the interval collection tree. By using the time range as an index value when storing the values used to render calendar content, a query can be issued to the tree for the unique ID values that correspond to each item of calendar content, changes in the user interface state, the extents of the calendar view, the zoom level, or any combination thereof, within a particular extent of time in O(log N) time. The values used to render calendar content include, but are not limited to, the unique identification (ID) values for each item of calendar content, changes in the user interface state, the extents of the calendar view, the zoom level, or any combination thereof, as stored in the interval collection tree. Given a particular time range in view, the interval collection tree (implemented as a balance tree) is queried to find only the IDs that occur within a particular time range. In embodiments, the time range associated with the calendar content may be a first interval, and a time range associated with a particular extent of a calendar view is a second interval. The interval collection tree may be used to determine if the first interval and the second interval overlap in time. In the interval collection tree, each node of the tree may include a particular time interval. The time interval of a node begins with the earliest start time of all its' child nodes and ends with the latest end time of all its' child nodes. Once the IDs of items within a particular time range stored in the interval tree are obtained, a calendar client then accesses the map data structure to retrieve the content of the item (e.g. title, location, attendees, etc.) using the unique ID obtained from the interval collection tree. The items of calendar content may be identified by their unique ID in the map data structure.

Figure 3:
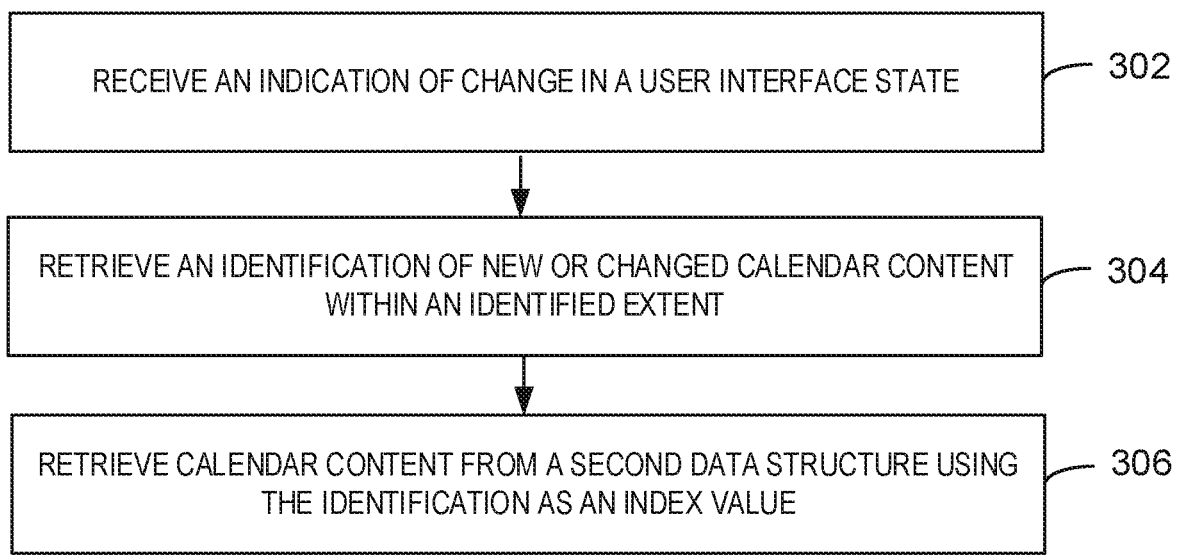
FIG. 3 is a process flow diagram of a method that enables a real-time collaboration in calendar.

FIG. 3 is a process flow diagram of a method 300 that enables a real-time collaboration in calendar. At block 302, in response to a changed user interface state at a first calendar client rendering a shared calendar, receiving an indication of a change in the user interface state at a second calendar client that is presently rendering the shared calendar. This change notification may include a pointer or other identification of the particular data structure has changed and an identification of a key into that data structure to indicate which fields are changing. In embodiments, the first calendar client is networked with a plurality of other calendar clients. Each calendar client may render a view of a shared calendar at its respective client device. Changes to the view are based on interactions or manipulations of the user interface at the first calendar client. In embodiments, the shared calendar may be a map calendar as described herein. Accordingly, the user interface of the shared calendar may be manipulated by zooming in or out of the shared calendar. The user interface of the shared calendar may also be manipulated by panning across the content of the shared calendar along an axis representing time.

At block 304, a unique ID of the changed calendar content is retrieved from a first data structure. In embodiments, the first data structure in an interval collection tree. An identified extent of the calendar view may be used to determine the interval used to retrieve unique IDs from the first data structure. In embodiments, the interval collection tree includes the IDs of calendar content items at various times. Thus, the interval collection tree may store an ID of the calendar content, the change in the user interface state, and the extent of the calendar view. The user interface state consists of the current zoom level or panning position. The extents of a current calendar view in time may be a duration of time rendered in a calendar view of a first calendar client. At block 306, the calendar content may be retrieved from a second data structure using the unique IDs as an index value. In embodiments, the second data structure is a map that is to store the calendar content according to the unique ID of the calendar content. The map data structure may be a level of abstraction above a merge-tree. In some cases, the map data structure is a dictionary. Once the calendar content is retrieved, the content may be rendered at a second client device according to the time extents and user interface state.

In this manner, all clients share the same user interface state. In embodiments, the sharing of the user interface state enables multiple clients to navigate together, simultaneously, and in real-time. When a first client pans or zooms the screen, the change in the user interface state is updated in the map data structure. All other clients with that calendar currently open receive a change notification and update their user interface based on that new state stored the map data structure. This enables shared navigation scenarios, where a first user can pan and zoom a screen on the user's local device and one or more users at one or more remote devices observe the same view of the calendar as the first user, instantly. Further, in embodiments, combined personal display scenarios are possible. For example, a user could the shared calendar on a mobile device to pan and zoom through the calendar, while a big-screen instance of the calendar is navigated to match user's pans, zooms, and other manipulations.

In embodiments, the only state replicated between clients according to the present techniques may be the extents of the user interface. Then, each calendar app instance can use those extents to navigate its local user interface to map the first, manipulated user interface. According to the present techniques, the content of the actual pixels is not replicated to all other clients. Thus, the present techniques are incredibly lightweight when compared to other collaboration techniques. Moreover, the present techniques are lightweight enough for low bandwidth/high latency connections since the amount of data replicated is small when compared with replicating pixels. For example, the data replicated can be limited to the numbers representing the user interface extents.

Figure 4:
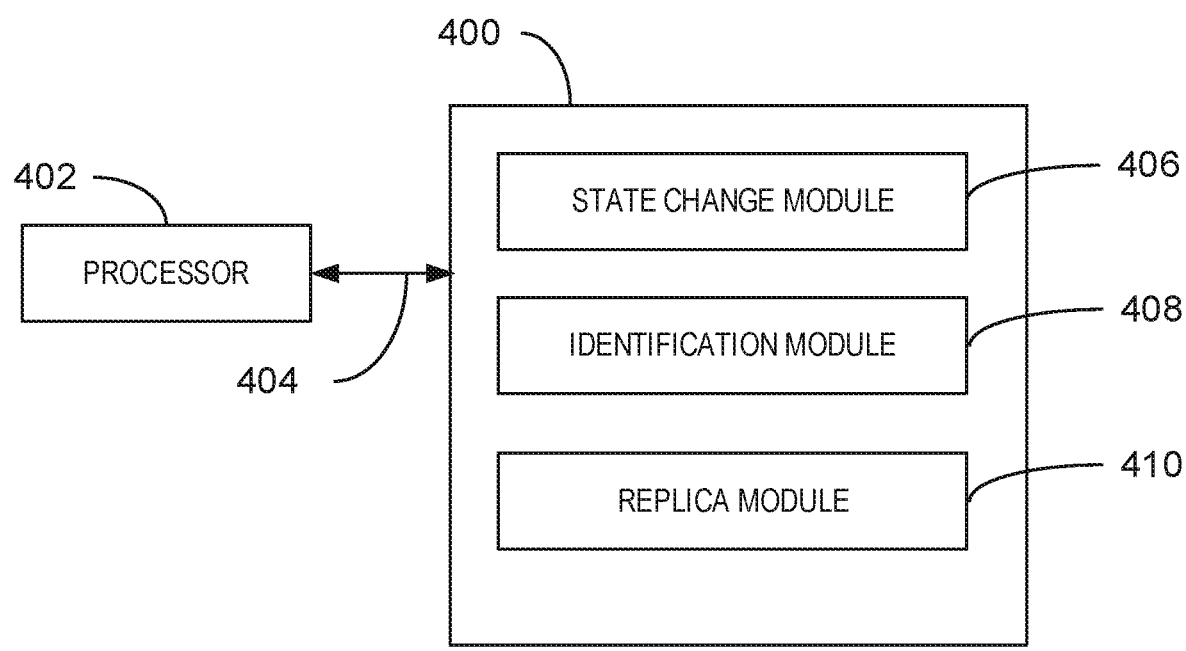
FIG. 4 illustrates a block diagram of a non-transitory computer readable media for that enables real-time collaboration in calendar.

FIG. 4 illustrates a block diagram of a non-transitory computer readable media for that enables real-time collaboration in calendar. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a state change module 406 may receive an indication of a change in the user interface state at a second calendar client that is presently rendering the shared calendar. The indication of change may be in response to in response to a changed user interface state at a first calendar client rendering a shared calendar. An identification module 408 may be configured to retrieve a unique ID of the changed calendar content from a first data structure. A replica module 410 may be configured to retrieve calendar content from a second data structure using the unique ID as an index value.

It is to be understood that any suitable number of the software components shown in FIG. 4 may be included within the tangible, non-transitory computer-readable medium 400. Furthermore, any number of additional software components not shown in FIG. 4 may be included within the tangible, non-transitory, computer-readable medium 400, depending on the specific application.

FIG. 5 is a block diagram of an example of a computing system that enables real-time collaboration in calendar. The example system 500 includes a computing device 502. The computing device 502 includes a processing unit 504, a system memory 506, and a system bus 508. In some examples, the computing device 502 can be a gaming console, a personal computer (PC), an accessory console, a gaming controller, among other computing devices. In some examples, the computing device 502 can be a node in a cloud network.

The system bus 508 couples system components including, but not limited to, the system memory 506 to the processing unit 504. The processing unit 504 can be any of various available processors. Dual microprocessors and other multiprocessor architectures also can be employed as the processing unit 504.

The system bus 508 can be any of several types of bus structure, including the memory bus or memory controller, a peripheral bus or external bus, and a local bus using any variety of available bus architectures known to those of ordinary skill in the art. The system memory 506 includes computer-readable storage media that includes volatile memory 510 and nonvolatile memory 512.

In some embodiments, a unified extensible firmware interface (UEFI) manager or a basic input/output system (BIOS), containing the basic routines to transfer information between elements within the computer 502, such as during start-up, is stored in nonvolatile memory 512. By way of illustration, and not limitation, nonvolatile memory 512 can include read-only memory (ROM), programmable ROM (PROM), electrically programmable ROM (EPROM), electrically erasable programmable ROM (EEPROM), or flash memory.

Volatile memory 510 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 502 also includes other computer-readable media, such as removable/non-removable, volatile/non-volatile computer storage media. FIG. 5 shows, for example a disk storage 514. In embodiments, the disk storage 514 may include a calendar content database that is to store at least one item of calendar content. Disk storage 514 includes, but is not limited to, devices like a magnetic disk drive, floppy disk drive, tape drive, Jaz drive, Zip drive, LS-210 drive, flash memory card, or memory stick.

In addition, disk storage 514 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 508, a removable or non-removable interface is typically used such as interface 516.

It is to be appreciated that FIG. 5 describes software that acts as an intermediary between users and the basic computer resources described in the suitable operating environment 500. Such software includes an operating system 518. Operating system 518, which can be stored on disk storage 514, acts to control and allocate resources of the computer 502.

System applications 520 take advantage of the management of resources by operating system 518 through program modules 522 and program data 524 stored either in system memory 506 or on disk storage 514. It is to be appreciated that the disclosed subject matter can be implemented with various operating systems or combinations of operating systems.

A user enters commands or information into the computer 502 through input devices 526. Input devices 526 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 526 connect to the processing unit 504 through the system bus 508 via interface ports 528. Interface ports 528 include, for example, a serial port, a parallel port, a game port, and a universal serial bus (USB).

Output devices 530 use some of the same type of ports as input devices 526. Thus, for example, a USB port may be used to provide input to the computer 502 and to output information from computer 502 to an output device 530.

Output adapter 532 is provided to illustrate that there are some output devices 530 like monitors, speakers, and printers, among other output devices 530, which are accessible via adapters. The output adapters 532 include, by way of illustration and not limitation, video and sound cards that provide a means of connection between the output device 530 and the system bus 508. It can be noted that other devices and systems of devices provide both input and output capabilities such as remote computing devices 534.

The computer 502 can be a server hosting various software applications in a networked environment using logical connections to one or more remote computers, such as remote computing devices 534. The remote computing devices 534 may be client systems configured with web browsers, PC applications, mobile phone applications, and the like. The remote computing devices 534 can be a personal computer, a server, a router, a network PC, a workstation, a microprocessor-based appliance, a mobile phone, a peer device or other common network node and the like, and typically includes many or all of the elements described relative to the computer 502.

Remote computing devices 534 can be logically connected to the computer 502 through a network interface 536 and then connected via a communication connection 538, which may be wireless. Network interface 536 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 538 refers to the hardware/software employed to connect the network interface 536 to the bus 508. While communication connection 538 is shown for illustrative clarity inside computer 502, it can also be external to the computer 502. The hardware/software for connection to the network interface 536 may include, for exemplary purposes, internal and external technologies such as, mobile phone switches, modems including regular telephone grade modems, cable modems and DSL modems, ISDN adapters, and Ethernet cards.

The computer 502 can further include a radio 540. For example, the radio 540 can be a wireless local area network radio that may operate one or more wireless bands. For example, the radio 540 can operate on the industrial, scientific, and medical (ISM) radio band at 2.4 GHz or 5 GHz. In some examples, the radio 540 can operate on any suitable radio band at any radio frequency.

The computer 502 includes one or more modules 522, such as a state change manager 542, an identification manager 544, and a replica manager 546. In some embodiments, the state change manager 542 may receive an indication of a change in the user interface state at a second calendar client that is presently rendering the shared calendar. The indication of change may be in response to in response to a changed user interface state at a first calendar client rendering a shared calendar. The identification manager 544 may be configured to retrieve a unique ID of the changed calendar content from a first data structure. A replica module 546 may be configured to retrieve calendar content from a second data structure using the unique ID as an index value. In this manner, calendar content may be rendered at an electronic device based on a particular set of rules associated with the summarization level.

It is to be understood that the block diagram of FIG. 5 is not intended to indicate that the computing system 502 is to include all of the components shown in FIG. 5. Rather, the computing system 502 can include fewer or additional components not illustrated in FIG. 5 (e.g., additional applications, additional modules, additional memory devices, additional network interfaces, etc.). Furthermore, any of the functionalities of the state change manager 542, identification manager 544, and replica manager 546 may be partially, or entirely, implemented in hardware and/or in the processing unit (also referred to herein as a processor) 504. For example, the functionality may be implemented with an application specific integrated circuit, in logic implemented in the processing unit 504, or in any other device.

EXAMPLES

Example 1 is an apparatus for a real-time collaboration in calendar. The apparatus includes a state change module to receive a change notification at a second calendar client rendering a shared calendar; an identification module to retrieve an identification (ID) of calendar content, a change in a user interface state, and an extent of a calendar view from a first data structure; and a replica module of the second calendar client to retrieve calendar content from a second data structure using the ID as an index value.

Example 2 includes the apparatus of example 1, including or excluding optional features. In this example, the change notification is issued in response to a change in a user interface state of a calendar, an extent of a view of the calendar, or an item of calendar content at a first calendar client rendering the shared calendar.

Example 3 includes the apparatus of any one of examples 1 to 2, including or excluding optional features. In this example, the change in the user interface state is a manipulation of a first user interface state to a second user interface state at a first calendar client.

Example 4 includes the apparatus of any one of examples 1 to 3, including or excluding optional features. In this example, the extent of the calendar view is a duration of time rendered in a calendar view of a first calendar client.

Example 5 includes the apparatus of any one of examples 1 to 4, including or excluding optional features. In this example, the second calendar client retrieves the calendar content and renders the calendar content according to the change in the user interface state and the extent of the calendar view.

Example 6 includes the apparatus of any one of examples 1 to 5, including or excluding optional features. In this example, the first data structure is an interval collection tree that comprises the ID of the calendar content, the change in the user interface state, and the extent of the calendar view.

Example 7 includes the apparatus of any one of examples 1 to 6, including or excluding optional features. In this example, the first data structure is updated in response to a manipulation of a view of the shared calendar at a first calendar client.

Example 8 includes the apparatus of any one of examples 1 to 7, including or excluding optional features. In this example, the second data structure is a map data structure that comprises a plurality of key-value pairs, wherein a key of a key-value pair is the ID, and the value is the calendar content.

Example 9 includes the apparatus of any one of examples 1 to 8, including or excluding optional features. In this example, the shared calendar is a map calendar.

Example 10 includes the apparatus of any one of examples 1 to 9, including or excluding optional features. In this example, a first calendar client and the second calendar client share data via the first data structure and the second data structure.

Example 11 is a method for a real-time collaboration in calendar. The method includes receiving a change notification; retrieving an identification (ID) of calendar content, a change in a user interface state, and an extent of a calendar view from a first data structure; and retrieving the calendar content from a second data structure using the ID as an index value.

Example 12 includes the method of example 11, including or excluding optional features. In this example, the method includes rendering the calendar content in real-time using the change in the user interface state and the extent of the calendar retrieved from the first data structure.

Example 13 includes the method of any one of examples 11 to 12, including or excluding optional features. In this example, the first data structure is an interval collection tree that comprises the ID of the calendar content, the change in the user interface state, and the extent of the calendar view.

Example 14 includes the method of any one of examples 11 to 13, including or excluding optional features. In this example, the first data structure is updated in response to a manipulation of a view of a shared calendar at a first calendar client.

Example 15 includes the method of any one of examples 11 to 14, including or excluding optional features. In this example, the second data structure is a map data structure that comprises a plurality of key-value pairs, wherein a key of a key-value pair is the ID, and a value is the calendar content.

Example 16 is a system for a real-time collaboration in calendar. The system includes a first calendar client rendering a shared calendar, wherein the first calendar client issues a change to a user interface state of the shared calendar, an extent of a calendar view, or calendar content, and updates a first data structure in response to the change in the user interface state or the extent of the calendar view, and updates a second data structure in response to the change in the calendar content; a state change module to receive a change notification at a second calendar client rendering the shared calendar; an identification module to retrieve an identification (ID) of calendar content, the change in the user interface state, and the extent of the calendar view from the first data structure; and a replica module of the second client to retrieve calendar content from the second data structure using the ID as an index value.

Example 17 includes the system of example 16, including or excluding optional features. In this example, the change notification is issued in response to the change in a user interface state of the shared calendar, an extent of a view of the shared calendar, or the calendar content by the first calendar client rendering the shared calendar.

Example 18 includes the system of any one of examples 16 to 17, including or excluding optional features. In this example, manipulation of calendar content at the first calendar client is rendered in real-time at the second calendar client.

Example 19 includes the system of any one of examples 16 to 18, including or excluding optional features. In this example, the first calendar transmits the change in user interface state to a networked calendar service that comprises the first data structure and the second data structure.

Example 20 includes the system of any one of examples 16 to 19, including or excluding optional features. In this example, the first data structure and the second data structure are based on a merge tree.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computing system, comprising:
a processor;
a display for rendering a shared map calendar comprising a continuous, manipulatable sequence of data organized as units of time within a coordinate plane;
a network interface for communicably coupling the computing system to a remote computing system; and
a computer readable medium comprising code to direct the processor to:
receive, from the remote computing system, a change notification corresponding to a change in a user interface state of the shared map calendar, wherein the change in the user interface state comprises a manipulation of a first user interface state of the shared map calendar to a second user interface state of the shared map calendar, and wherein the first user interface state comprises an extent of a first calendar view of the shared map calendar and the second user interface state comprises an extent of a second calendar view of the shared map calendar;
retrieve an identification (ID) value corresponding to the change in the user interface state from a first data structure;
retrieve the change in the user interface state from a second data structure using the ID value as an index value; and
render the shared map calendar according to the change in the user interface state.

2. The computing system of claim 1, wherein the change notification is issued in response to the change in the user interface state of the shared map calendar, as rendered by the remote computing system.

3. The computing system of claim 1, wherein the extent of the first calendar view is a duration of time rendered in the first calendar view, and the extent of the second calendar view is a duration of time rendered in the second calendar view.

4. The computing system of claim 1, wherein the first data structure is an interval collection tree that comprises the ID value corresponding to the change in the user interface state.

5. The computing system of claim 1, wherein the first data structure is updated in response to a manipulation of a view of the shared map calendar at the remote computing system.

6. The computing system of claim 1, wherein the second data structure is a map data structure that comprises a plurality of key-value pairs, wherein a key of a key-value pair is the ID value corresponding to the change in the user interface state, and the value is the change in the user interface state.

7. The computing system of claim 1, wherein the computing system and the remote computing system share data corresponding to the shared map calendar via the first data structure and the second data structure.

8. A computer-implemented method for real-time collaboration in a shared map calendar, comprising:
rendering a shared map calendar comprising a continuous, manipulatable sequence of data organized as units of time within a coordinate plane;
receiving, from a remote computing system, a change notification corresponding to a change in a user interface state of the shared map calendar, wherein the change in the user interface state comprises a manipulation of a first user interface state of the shared map calendar to a second user interface state of the shared map calendar, and wherein the first user interface state comprises an extent of a first calendar view of the shared map calendar and the second user interface state comprises an extent of a second calendar view of the shared map calendar;
retrieving an identification (ID) value corresponding to the change in the user interface state from a first data structure;
retrieving the change in the user interface state from a second data structure using the ID value as an index value; and
rendering the shared map calendar according to the change in the user interface state.

9. The computer-implemented method of claim 8, comprising rendering the shared map calendar according to the change in the user interface state in real-time as the change notification is received from the remote computing system.

10. The computer-implemented method of claim 8, wherein the first data structure is an interval collection tree that comprises the ID value corresponding to the change in the user interface state.

11. The computer-implemented method of claim 8, wherein the first data structure is updated in response to a manipulation of a view of the shared map calendar at the remote computing system.

12. The computer-implemented method of claim 8, wherein the second data structure is a map data structure that comprises a plurality of key-value pairs, wherein a key of a key-value pair is the ID value corresponding to the change in the user interface state, and the value is the change in the user interface state.

13. A computer readable medium comprising code to direct a processor to:
render a shared map calendar comprising a continuous, manipulatable sequence of data organized as units of time within a coordinate plane;
receive, from a remote computing system, a change notification corresponding to a change in a user interface state of the shared map calendar, wherein the change in the user interface state comprises a manipulation of a first user interface state of the shared map calendar to a second user interface state of the shared map calendar, and wherein the first user interface state comprises an extent of a first calendar view of the shared map calendar and the second user interface state comprises an extent of a second calendar view of the shared map calendar;
retrieve an identification (ID) value corresponding to the change in the user interface state from a first data structure;
retrieve the change in the user interface state from a second data structure using the ID value as an index value; and
render the shared map calendar according to the change in the user interface state.

14. The computer readable medium of claim 13, wherein the change notification is issued in response to the change in the user interface state of the shared map calendar, as rendered by the remote computing system.

15. The computer readable medium of claim 13, wherein a manipulation of the shared map calendar at the remote computing system is rendered in real-time at the computing system.

16. The computer readable medium of claim 13, wherein the ID value and the change in the user interface state are retrieved from a networked calendar service that comprises the first data structure and the second data structure.

17. The computer readable medium of claim 13, wherein the first data structure and the second data structure are based on a merge tree.

* * * * *